United States Patent [19]

Comerford

[11] Patent Number: 5,227,929
[45] Date of Patent: Jul. 13, 1993

[54] PORTABLE COMPUTER HARD DISK PROTECTIVE REFLEX SYSTEM

[75] Inventor: Liam D. Comerford, Carmel, N.Y.

[73] Assignee: International Business Machines Corporation, Armonk, N.Y.

[21] Appl. No.: 618,192

[22] Filed: Nov. 26, 1990

[51] Int. Cl.$^5$ .................... G11B 21/20; G06F 11/00
[52] U.S. Cl. ............................ 360/75; 371/4
[58] Field of Search ..................... 360/75; 371/4

[56] References Cited

U.S. PATENT DOCUMENTS

| | | | |
|---|---|---|---|
| 4,040,103 | 8/1977 | White | 360/75 |
| 4,692,915 | 9/1987 | Moriya et al. | 369/54 X |
| 4,862,298 | 8/1989 | Genheimer | 360/75 X |
| 4,897,743 | 1/1990 | Kohno | 360/75 |

FOREIGN PATENT DOCUMENTS 2187031  8/1987  United Kingdom .................. 360/75

*Primary Examiner*—Aristotelis Psitos
*Assistant Examiner*—Varsha V. Sheladia
*Attorney, Agent, or Firm*—Whitham & Marhoefer

[57] ABSTRACT

A protective reflex system for a portable computer hard disk initiates protective action before the hard disk suffers the shock of an impact in the event they fall from, for example, a user's lap. A three axis accelerometer is mounted in the portable computer. The output of the accelerometer is continuously monitored by a dedicated processor. In the event of an acceleration event within a preset range of values, the dedicated processor passes a high priority interrupt to the central processing unit of the portable computer and then proceeds to park the disk heads. Alternately, the interrupt routine of the central processing unit may also cause the park operation. In addition to park operation, a brake operation may be performed by either the dedicated processor or the central processing unit.

9 Claims, 2 Drawing Sheets

PORTABLE COMPUTER HARD DISK PROTECTIVE REFLEX SYSTEM

BACKGROUND OF THE INVENTION

1. Field of the Invention

The present invention generally relates to protection systems for computer hard disk drives in portable computers and, more particularly, to, a reflexive system for parking the heads of a hard disk and, optionally, stopping the spinning of the magnetic media platters in the event the computer is dropped.

2. Description of the Prior Art

Portable personal computers (PCs) have become more and more popular. Part of this popularity is due to providing portable computer with much the same power and features of desk top workstations. Among these features are hard disks which are now quite common in portable computers.

Portable computers are subject to forms of failure which are not a problem for desk top workstations. They can run out of power and they can be dropped. While this latter jeopardy is a threat to every component in the system, it is the hard disk drive which has the lowest threshold of failure in the event the computer is dropped. This component is so vulnerable to shock because it is dependent on the maintenance of a very small gap between the drive heads and the disk platters. The size of this gap is a key factor in the quantity of data which can be stored on the disk. In general, the smaller the gap, the more the data which can be stored. Thus, small, and hence vulnerable, gap dimensions are the rule for hard disks. The technology routinely used to obtain small gap height is aerodynamic. The head is literally flown over the platter surface to place the heads as close to the platters as possible without allowing contact. If the head were to contact the platter, the result could be both the destruction of the head and the removal of magnetic material (and hence data) from the platter.

Disk manufacturers recognize this hazard and attempt to address it by shock mounting their drives, by publishing the G-force limits their drives can tolerate, and by providing a position in which the heads may be "parked" in which the drive can tolerate accelerations which are far greater than are tolerable when the heads are "loaded".

The prior art addresses two kinds of events which may destroy the data integrity or hardware integrity of a hard disk. One of these event types is electrical power failure. This problem is addressed, for example, in U.S. Pat. No. 4,786,995 to Stupeck et al., U.S. Pat. No. 4,831,469 to Hanson et al., and U.S. Pat. No. 4,866,554 to Stupeck et al. In each of these patents, the energy stored in the motion of the disk heads is tapped by using the disk spindle motor as a generator. The power derived from this source is used to retract the disk head. Electromagnetic braking of the spindle is also contemplated. Provisions are made by one invention to shut down in the event of other voltage faults beside that of power failure.

The second event type is physical or mechanical impact. In U.S. Pat. No. 4,040,103 to White, an accelerometer is used to detect the magnitude and direction of a shock so that the hard disk head flying height can be adjusted. This adjustment is possible because the accelerometer is mounted on the disk driver frame while the drive itself is mounted to that frame by shock absorbers. The time delay for shock transmission supplied by the shock absorbers allows the flying height correction to be calculated prior to the shock arriving at the disk head.

In U.S. Pat. No. 4,862,298 to Genheimer et al., impact detection is used to generate a write-fault signal to the computing system. This signal is used to prevent data destruction by off-track writes and to cause head retraction in the event of severe impacts. This device relies on the fact that the read and write operations on disk drives involve sectors of significant extent so that if an impact is detected, it is very likely that it will occur in the course of a sector operation rather than at its very end. The system is thus expected to have the time required to abort the read or write operation without storing or retrieving corrupted data.

The problems with each of these techniques is that remedial action is taken after the failure or impact has occurred and may be too late to prevent damage. In the case of impact, what is needed is a system which can anticipate the possibility of impact and take protective action before the impact actually occurs.

SUMMARY OF THE INVENTION

It is therefore an object of the present invention to provide a protective reflex system for a portable computer hard disk which initiates protective action before the hard disk suffers the shock of an impact.

It is a further object of the invention to provide, in a portable computer, a means by which hard disk drives in the active, un-parked state may be protected from possible destruction in the event they fall from, for example, a user's lap.

According to the present invention, a three axis, quick response accelerometer is mounted in the portable computer. The output of the accelerometer is continuously monitored by a dedicated processor. In the event of an acceleration within a preset range of values close to 1G, the dedicated processor passes a high priority interrupt to the central processing unit of the portable computer and proceeds to park the disk heads. The interrupt handler routine simultaneously performs those actions which that computer may need to perform to deal with the loss of disk availability.

Alternatively, the interrupt routine of the central processing unit may also perform the park operation. In addition, the dedicated processor or the central processing unit may cause a brake operation to be performed to slow or stop the rotation of the hard disk. Preferably, the park and brake operations are performed simultaneously in parallel by the dedicated processor and the central processing unit.

BRIEF DESCRIPTION OF THE DRAWINGS

The foregoing and other objects, aspects and advantages will be better understood from the following detailed description of a preferred embodiment of the invention with reference to the drawings in which.

DETAILED DESCRIPTION OF A PREFERRED EMBODIMENT OF THE INVENTION

Figure 1:
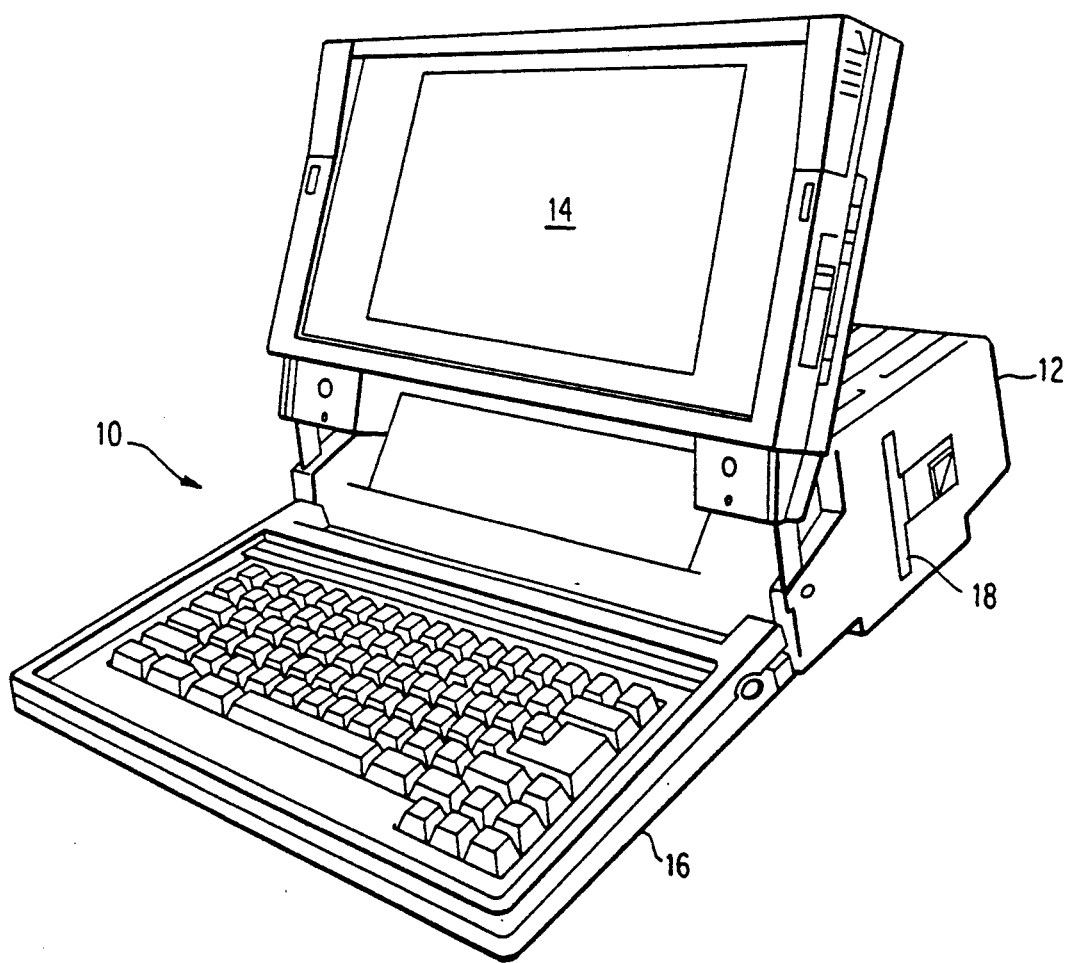
FIG. 1 is a perspective view of a portable computer of the type commonly having a hard disk.

Referring now to the drawings, and more particularly to FIG. 1, there is shown a typical portable personal computer (PC) 10, sometimes referred to a laptop computer. The configuration shown includes a system unit case 12 to which is attached a hinged liquid crystal display (LCD) 14 that folds down for attachment to a keyboard 16 for transportation. On the right side of the system case 12, there is a 3½ floppy disk drive 18 and within the case is a hard disk drive (not shown).

The portable PC shown in FIG. 1 is merely for purposes of illustration. Portable PCs are configured in a variety of different ways. For example, the system unit case 12 may be integrated under and in one unit with the keyboard 16 with the LCD display hinged at the back of this integrated unit. Alternatively, the system unit case 12 may be integrated behind the display 14 with the keyboard 16 detachable from the face of the display. Moreover, the display may be a gas plasma panel or other so-called "flat screen" display rather than an LCD, and while it is typical for portable PCs to have at least one floppy disk drive, such as the disk drive 18 shown in FIG. 1, the location of that disk drive may be at the front of the computer or other convenient location. The point is that no matter what the outside physical configuration of the portable computer, many are now being equipped with a hard disk drive and due to the portability of the computer, the hard disk drive is in jeopardy of damage or destruction due to the shock of an impact, such as caused by the computer being dropped.

The time required to park a disk drive head is on the order of three times the average seek time. This is in the range of 50 to 200 milliseconds, assuming that the current track is known and that the head is parked with a seek operation. The time required to fall a distance of one foot is 250 milliseconds. The present invention is a system which will protect hard disks in portable computers by sensing the 1G acceleration of a fall and causing the disk heads to park in that event.

Figure 2:
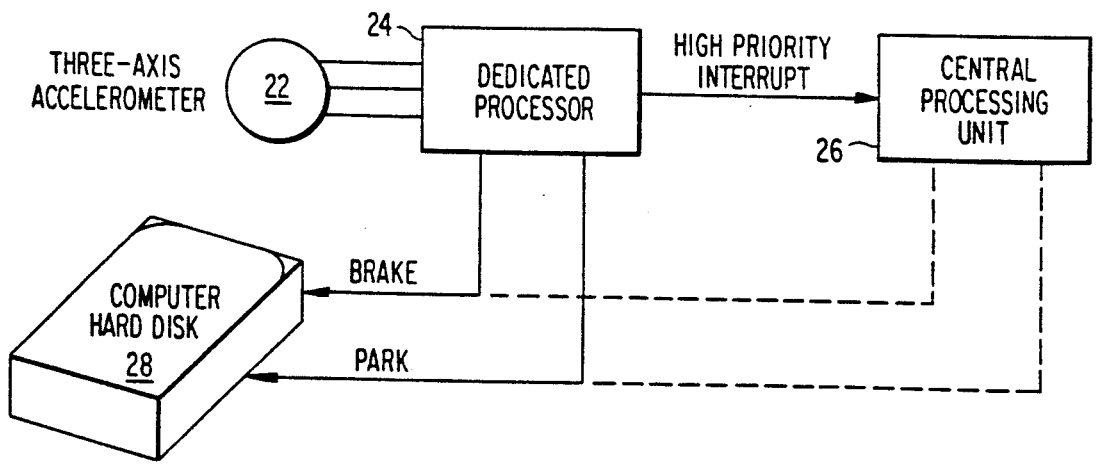
FIG. 2 is a functional block diagram showing the components of the protective reflex system according to the invention.

According to the invention, a three-axis accelerometer is mounted within the computer system case 12, preferably as a component part of the hard disk and mounted to the frame of the hard disk. As shown in FIG. 2, the accelerometer 22 provides output signals for each of the three axes to a dedicated processor 24 which continuously monitors the acceleration signals, computes the resultant acceleration vector and compares the scaler magnitude of the acceleration vector with a preset range of values. The preset range is chosen to represent an acceleration that would suggest an impending impact. In the event that a value in the preset range for acceleration is calculated, the dedicated processor 24 generates a high priority interrupt to the central processor unit (CPU) 26 of the portable computer and proceeds to park the disk heads of the hard disk 28 rapidly and, optionally, to brake the hard disk's rotation. The interrupt handler of the CPU 26 simultaneously performs those actions which that computer and operating system may be able to perform to deal with the loss of disk availability. Alternatively, the interrupt routine of the CPU 26 may initiate the disk park and brake operations, as indicated by the dotted lines in FIG. 2. An advantage of having, for example, the dedicated processor 24 perform the park subroutine while the CPU 26 performs the braking subroutine is that the two subroutines can be processed simultaneously by the two processors in parallel.

Figure 3:
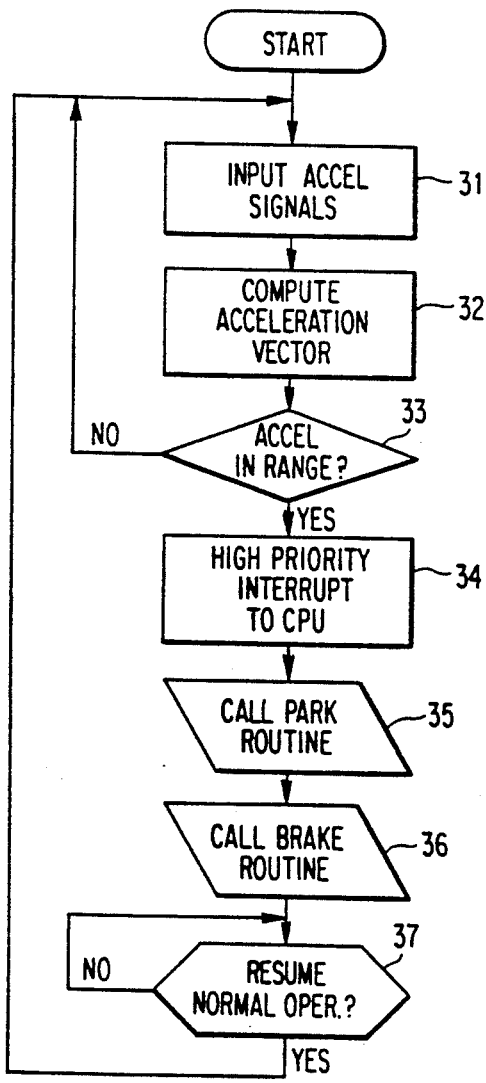
FIG. 3 is a flow diagram illustrating the logic of the computer control program for the protective reflex system of the invention.

Turning now to FIG. 3 there is shown a flow diagram of the logic of the protective reflex system just described. The process starts by inputting the three acceleration inputs to the dedicated processor 24, as represented by function block 31. The dedicated processor 24 computes the acceleration vector, as represented by function block 32. The scaler value of the acceleration vector is compared with the preset range of values in decision block 33. When the value of the calculated acceleration falls within the range continuously for a period suggesting a fall is in progress, the dedicated processor 24 generates a high priority interrupt to the CPU 26, as represented by the function block 34. In operation block 35, depending on the specific implementation of the invention, either the dedicated processor 24 or the CPU 26 calls the park subroutine which causes the heads of the hard disk 28 to be parked rapidly.

At this point in the flow diagram, the main reflexive action, i.e., parking of the heads, has been accomplished. Further action can optionally be taken to enhance the protective system according to the invention. In addition to calling the park subroutine, a motor braking subroutine may be called, as indicated by operation block 36. Again, this subroutine may be called by either the CPU 26 or the dedicated processor 24. The system then awaits resumption of normal operations, as indicated by decision block 37. Further variations might include testing for a disk drive motor stopped condition followed by a power down procedure.

While the invention has been described in terms of a single preferred embodiment with optional features, those skilled in the art will recognize that the invention can be practiced with modification within the spirit and scope of the appended claims.

I claim:

1. A protective reflex system for a portable computer hard disk which initiates protective action before the hard disk suffers the shock of an impact, said hard disk having at least a one head flying above at least one motor driven rotating disk and said portable computer having a central processing unit, said protective reflex system comprising:
    a three axis accelerometer mounted in the portable computer and generating signals proportional to accelerations along three axes; and
    a dedicated processor for continuously monitoring said accelerometer signals and computing an acceleration vector, said dedicated processor further comparing a scaler value of said acceleration vector to a preset range of values close to 1G corresponding to a free fall condition and passing a high priority interrupt to the central processing unit of the portable computer when said scaler value falls within said preset range;
    one of said dedicated processor or said central processing unit calling a routine to park said at least one head of the hard disk rapidly before the hard disk suffers the shock of an impact.

2. The protective reflex system recited in claim 1 wherein one of said dedicated processor or said central processing unit further calls a routine to brake the rotation of said hard disk.

3. The protective reflex system recited in claim 2 wherein said dedicated processor calls the routine to park said at least one head of the hard disk rapidly while said central processing unit calls the routine to brake the rotation of said hard disk, said routines being processed simultaneously in parallel by said dedicated processor and said central processing unit.

4. The protective reflex system recited in claim 1 wherein said hard disk further has a frame and said accelerometer is mounted on said frame.

5. The protective reflex system recited in claim 1 wherein said dedicated processor calls the routine to park said at least one head of the hard disk rapidly.

6. A reflective method for protecting a portable computer hard disk by initiating protective action before the hard disk suffers the shock of an impact, said hard disk having at least a one head flying above at least one motor driven rotating disk and said portable computer having a central processing unit and being further provided with a three-axis accelerometer and a dedicated processor, said reflective method comprising the steps of:

monitoring by said dedicated processor signals from said accelerometer proportional to accelerations along three axes;

computing by said dedicated processor an acceleration vector and comparing a scaler value of said acceleration vector to a preset range of values close to 1G corresponding to a free fall condition and passing a high priority interrupt to the central processing unit of the portable computer when said scaler value exceeds said preset range; and parking by said dedicated processor or said central processing unit said at least one head of the hard disk rapidly before the hard disk suffers the shock of an impact.

7. The reflexive method recited in claim 6 further comprising the step of braking by one of said dedicated processor or said central processing unit the rotation of said hard disk.

8. The reflexive method recited in claim 7 wherein said step of parking said at least one head of the hard disk rapidly is performed by said dedicated processor while said step of braking the rotation of said hard disk is performed by said central processing unit, said steps being performed simultaneously in parallel by said dedicated processor and said central processing unit.

9. The reflexive method recited in claim 6 wherein said step of parking said at least one head of the hard disk rapidly is performed by said dedicated processor.

* * * * *